United States Patent
Krupinski et al.

(10) Patent No.: US 8,168,722 B2
(45) Date of Patent: *May 1, 2012

(54) INTERPOLYMER RESIN PARTICLES

(75) Inventors: Steven M. Krupinski, Pittsburgh, PA (US); Eric Vignola, Aliquippa, PA (US)

(73) Assignee: NOVA Checmials Inc., Moon Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,870

(22) Filed: Feb. 24, 2011
(Under 37 CFR 1.47)

(65) Prior Publication Data

US 2012/0021238 A1 Jan. 26, 2012

Related U.S. Application Data

(60) Continuation-in-part of application No. 12/169,776, filed on Jul. 9, 2008, now Pat. No. 7,906,589, which is a division of application No. 11/007,678, filed on Dec. 8, 2004, now Pat. No. 7,411,024.

(60) Provisional application No. 60/537,784, filed on Jan. 20, 2004.

(51) Int. Cl.
*C08F 8/00* (2006.01)
*C08L 23/00* (2006.01)
*C08L 25/02* (2006.01)

(52) U.S. Cl. .......... 525/191; 525/240; 525/241

(58) Field of Classification Search .......... 525/191, 525/240, 241
See application file for complete search history.

(56) References Cited

U.S. PATENT DOCUMENTS

| | | | |
|---|---|---|---|
| 3,959,189 A | 5/1976 | Kitamori | |
| 4,168,353 A | 9/1979 | Kitamori | |
| 4,303,756 A | 12/1981 | Kajimura et al. | |
| 4,303,757 A | 12/1981 | Kajimura et al. | |
| 4,622,347 A | 11/1986 | Fudge | |
| 4,647,593 A | 3/1987 | Bartosiak et al. | |
| 4,677,134 A | 6/1987 | Fudge | |
| 4,692,471 A | 9/1987 | Fudge | |
| 4,782,098 A | 11/1988 | Allen et al. | |
| 8,053,525 B2 * | 11/2011 | Vignola | 525/191 |
| 2006/0063847 A1 | 3/2006 | Matsumura et al. | |
| 2006/0217452 A1 | 9/2006 | Inada et al. | |
| 2010/0048752 A1 * | 2/2010 | Vignola et al. | 521/139 |
| 2012/0035313 A1 * | 2/2012 | Vignola | 524/521 |

* cited by examiner

*Primary Examiner* — Nathan M Nutter

(74) *Attorney, Agent, or Firm* — Gary F. Matz

(57) ABSTRACT

A polymer composition that includes from 0.1 to 60 percent by weight of interpolymer resin particles containing a styrenic polymer intercalated within a polyolefin and from 40 to 99.9 percent by weight of at least one second polymer. The polyolefin is present at from 20% to 80% by weight based on the weight of the particles, has a VICAT softening temperature greater than 60° C. and a melt index of from 0.3 to 15 g/10 minutes (190° C./2.16 kg). The styrenic polymer is present at from 20% to 80% by weight based on the weight of the particles. The interpolymer resin particles have a gel content ranging from 0 to 5% by weight based on the weight of said interpolymer resin particles, a VICAT softening temperature ranging from 85° C. to 115° C., and a melt index value ranging from 0.1 to 6.0 (230° C./5.0 kg).

19 Claims, 1 Drawing Sheet

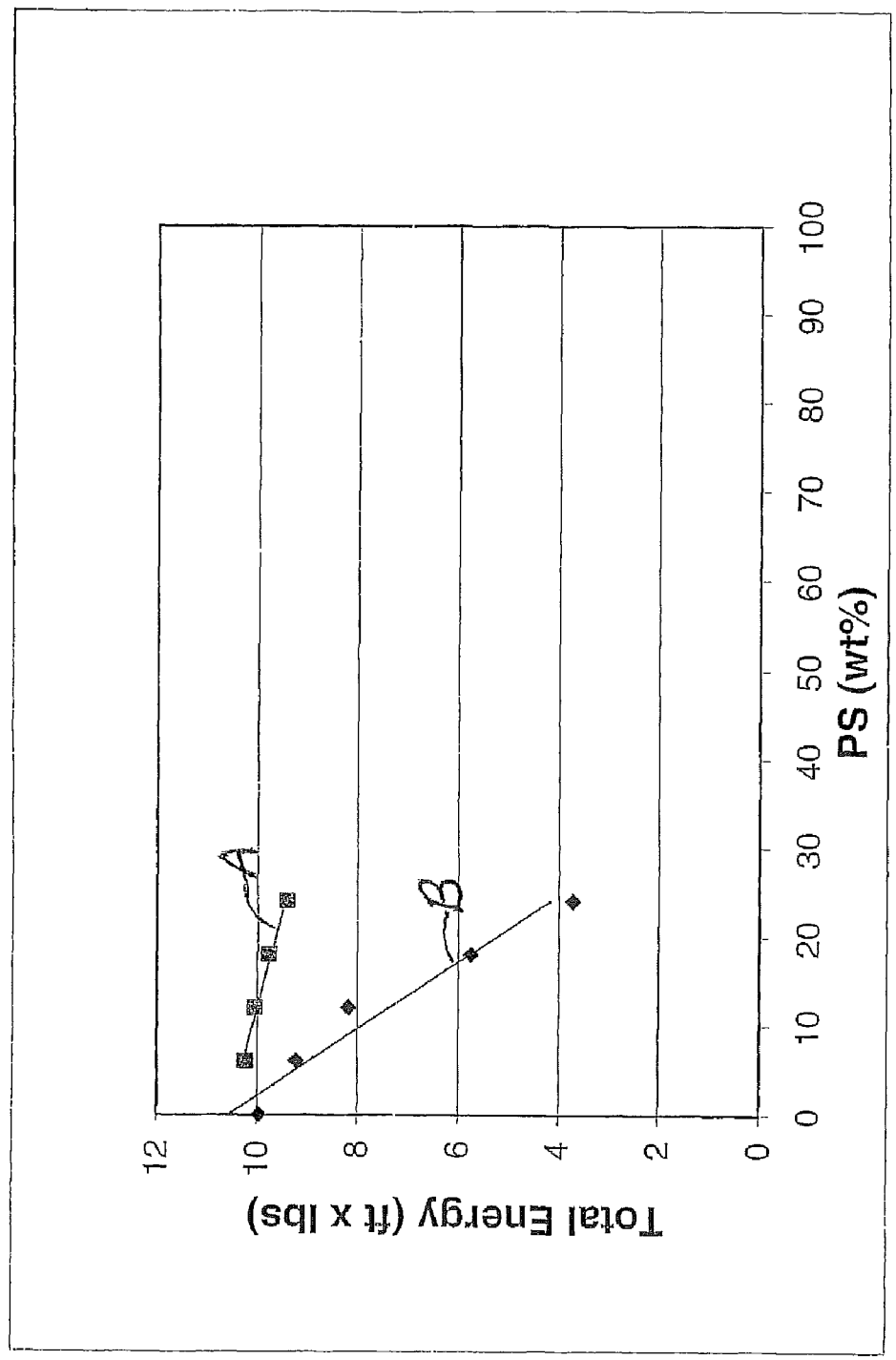
FIGURE

INTERPOLYMER RESIN PARTICLES

REFERENCE TO RELATED APPLICATION

This application is a Continuation-In-Part of application Ser. No. 12/169,776 filed Oct. 30, 2008 entitled "Interpolymer Resin Particles" now U.S. Pat. No. 7,906,589, which is a divisional application from application Ser. No. 11/007,678 filed Dec. 8, 2004 entitled "Interpolymer Resin Particles" now U.S. Pat. No. 7,411,024, which claims the benefit of priority of U.S. Provisional Application Ser. No. 60/537,784 filed Dec. 22, 2003 entitled "Interpolymer Resin Particles," which are all herein incorporated by reference in their entirety.

BACKGROUND OF THE INVENTION

1. Field of the Invention

The present invention relates to polyolefin resin particles that contain a vinyl aromatic monomer that is polymerized in the polyolefin matrix to form an interpenetrating network of polyolefin-polymerized vinyl aromatic monomer, e.g., polystyrene. More particularly, the present invention relates to interpolymer resin particles that have little or no gel content; to a process for producing the interpolymer resin particles; to a polymer composition containing the interpolymer resin particles and a second polymer; and to articles made from the interpolymer resin particles and/or from the aforesaid polymer composition. These articles may be formed via processing techniques, e.g., sheet extrusion, rotomolding, thermoforming, compression molding, injection molding, blown film extrusion, and direct-injection foamed sheet extrusion.

2. Background Art

It is known to polymerize vinyl aromatic monomers, such as styrene, in polyethylene. For example, U.S. Pat. No. 3,959,189 issued to Kitamori and assigned to Sekisui Kaseihin Kabushiki Kaisha, discloses a process for producing polyethylene resin particles. The polyethylene resin particles have a melt index (MI) value of 0.3 to 10 (190° C./2.16 kg), a density of less than 0.93 g/cm$^3$ and a VICAT softening point below 85° C. After the polyethylene resin particles are added to an aqueous suspension, 30% to 100% by weight based on the weight of the particles of a styrene monomer and a catalyst for polymerizing the monomer are added to the suspension, and the styrene monomer is polymerized therein. Embodiments include adding a cross-linking agent to the polyethylene prior to the polymerization and cross-linking the polyethylene before impregnating a blowing agent into the polyethylene resin particles to form foamable polyethylene resin particles. In view of the cross-linking agent, the polyethylene-polystyrene resin particles generally have high gel content, i.e., from about 10% to 45% by weight. The gel content of the final foamed shaped article can be as high as 60% to 80% by weight. Even though these cross-linked polyethylene-polystyrene resin foams may have superior thermal stability and toughness, these same characteristics make these resin particles unsuitable for use in processes such as compounding, extrusion processing, and injection molding since the cross-linking effect tends to reduce the melt flow of these particles which affects the processability of these particles in that the amperage needed to operate the processing machinery, e.g., extruder is increased. The melt fracture is therefore increased resulting in surface irregularities, such as holes and ridges.

A further example of polystyrene resin polymerized in polyethylene resin particles is described in Japanese Patent No. 32623/70. Cross-linking of the polyethylene resin, polymerization of styrene, and impregnation of the blowing agent are carried out at the same time. Since the polyethylene resin particles are cross-linked, the polyethylene resin particles generally contain a high gel content, i.e., at least about 24% by weight, making these polyethylene resin particles generally unsuitable for polymer processing, such as extrusion, injection molding, blown film, and direct injection foamed sheet extrusion. If the gel content is too high, hard spots form on the surface resulting in poor surface quality. The processing of the polymer proves to be difficult due to the high amperage needed for the machinery used to process the polymer, for example, extruders or injection molding machines.

U.S. Pat. No. 4,782,098 assigned to General Electric Co. discloses expandable interpolymer beads comprising polyphenylene ether resin and a polymerized vinyl aromatic monomer such as styrene. The vinyl aromatic monomer is polymerized in the presence of a polymerization catalyst to polymerize the vinyl aromatic monomer with the polyphenylene ether to form the interpolymer beads. Optionally, a cross-linking agent is added. A blowing agent is introduced under pressure into the thermoplastic resin beads. The cross-linking agent may be di-t-butyl peroxide, t-butyl cumyl peroxide, dicumyl peroxide, α,α-bis(t-butyl peroxy)p-di-isopropylbenzene, 2,5-dimethyl-2,5-di(t-butyl peroxy)hexyne-3,2, 5-dimethyl-2,5-di(benzoyl peroxy)hexane, and t-butyl peroxy isopropyl carbonate. Here again, when a cross-linking agent is used, the polyphenylene ether resin has a gel content of at least about 24% by weight. Since the morphology of the polyphenylene ether resin is amorphous, the resin generally may have poor environmental stress crack resistance (ESCR) properties.

U.S. Pat. Nos. 4,303,756 and 4,303,757 to Kajimura, et al. and assigned to Sekisui Kaseihin Kogyo Kabushiki Kaisha disclose a process for producing expandable thermoplastic resin beads. The process comprises suspending in an aqueous medium 20% to 70% by weight of a random copolymer of propylene and ethylene (U.S. Pat. No. 4,303,756) or polypropylene resin particles (U.S. Pat. No. 4,303,757), and 30% to 80% by weight of a vinyl aromatic monomer such as styrene; polymerizing the vinyl aromatic monomer in the presence of a polymerization catalyst to graft the vinyl aromatic monomer onto the backbone of polypropylene; and, optionally, adding a cross-linking agent to form graft-copolymerized thermoplastic resin beads; and introducing a blowing agent into the thermoplastic resin beads.

In general, the interpolymer resin particles of the above prior art generally are expandable thermoplastic resin particles having a high gel content of about 10% to 45% by weight in at least one instance and in the other instances about 24% by weight which limits the processability of the beads or particles when converted into articles such as solid sheet, film, etc. through processing techniques such as sheet extrusion, rotomolding, thermoforming, compression molding, injection molding, blown film extrusion, and direct-injection foamed sheet extrusion. Also, in general, the interpolymer resin particles of the prior art are impregnated with a blowing agent in a further suspension process to form foamable or expandable particles that are used for foam moldings.

Expandable interpolymers of polypropylene and polyvinyl aromatic monomers are also disclosed in Kent D. Fudge U.S. Pat. Nos. 4,622,347; 4,677,134 and 4,692,471; and in Bartosiak et al U.S. Pat. No. 4,647,593, all of which are assigned to Atlantic Richfield Company. These interpolymers may be prepared according to the teachings of the aforesaid U.S. Pat. No. 4,303,756. The interpolymers are made expandable by impregnating them with a blowing agent. The particles are expanded under normal conditions for polystyrene particles to low density, fine cell structure foams by viscbreaking the interpolymers to a melt flow (230° C./2.16 kg) of at least double their original value and adding a lubricant and cell control agent while maintaining orientation stress in the final product at a minimum. Since the interpolymer particles of these aforesaid patents may be prepared according to U.S. Pat. No. 4,303,756, the interpolymer particles have the same limitations outlined in the above discussion of the '756 patent in that the interpolymer particles generally have a high gel content, i.e., about 24% by weight. These viscbroken interpolymer particles are impregnated with a blowing agent in a further suspension process to produce foamable or expandable particles for foam moldings.

SUMMARY OF THE INVENTION

The present invention provides a polymer composition that includes from about 0.1 to about 60 percent by weight of interpolymer resin particles containing a styrenic polymer intercalated within a polyolefin and from about 40 to about 99.9 percent by weight of at least one second polymer. The polyolefin is present at from about 20% to about 80% by weight based on the weight of the particles, has a VICAT softening temperature greater than 60° C. and a melt index of from about 0.3 to about 15 g/10 minutes (190° C./2.16 kg). The styrenic polymer is present at from about 20% to about 80% by weight based on the weight of the particles. The interpolymer resin particles have a gel content ranging from about 0 to about 5% by weight based on the weight of said interpolymer resin particles, a VICAT softening temperature ranging from about 85° C. to about 115° C., and a melt index value ranging from about 0.1 to about 6.0 (230° C./5.0 kg).

The present invention also provides a film of a polymer composition that includes from about 0.1 to about 60 percent by weight of interpolymer resin particles containing a styrenic polymer intercalated within a polyolefin and from about 40 to about 99.9 percent by weight of at least one second polymer. The polyolefin is present at from about 20% to about 80% by weight based on the weight of the particles and the styrenic polymer is present at from about 20% to about 80% by weight based on the weight of the particles.

The present invention also provides methods of improving the physical properties of a polyolefin film. The methods include blending from about 0.1 to about 10 percent by weight based on the weight of the film of interpolymer resin particles into the polyethylene prior to forming the film. The interpolymer resin particles include a styrenic polymer intercalated within a polyolefin. The polyolefin is present at from about 20% to about 80% by weight based on the weight of the particles, and the styrenic polymer is present at from about 20% to about 80% by weight based on the weight of the particles.

BRIEF DESCRIPTION OF THE DRAWING

The FIGURE is a graph showing the results when Composition A and Composition B are plotted against Total Energy (ft. lbs.) (DYNATUP) versus the weight percentages of polystyrene, which is a component of Composition A and Composition B.

DETAILED DESCRIPTION OF THE INVENTION

The invention overcomes the above-described disadvantages of the prior art.

The present invention provides non-expandable interpolymer resin particles with a crystalline morphology and having little or no gel content, whereby the processing characteristics of the particles in fabrication equipment for forming articles, such as sheet or film or foam, is improved. The gel content ranges from about 0 to about 1.5% by weight, preferably, from about 0 to about 0.8% by weight, and more preferably, from about 0 to about 0.5% by weight based on the weight of the interpolymer particles. The VICAT softening temperature of the interpolymer resin particles ranges from about 85° C. to about 115° C., and the melt index values range from about 0.2 to about 35.0 g/10 minutes (230° C./5.0 kg).

The invention provides a process for producing interpolymer resin particles that includes: a) suspending in an aqueous medium from about 20% to 60% (80%) by weight of polyolefin resin particles having a VICAT softening temperature greater than 60° C., in some cases greater than 75° C., and in other cases greater than 85° C. and a melt flow of about 2.1 g/10 minutes (190° C./2.16 kg); b) minimizing or eliminating the cross-linking of the polyolefin resin particles; c) adding to the aqueous suspension from about 20 to 80% by weight of a vinyl aromatic monomer and a polymerization initiator for polymerizing the vinyl aromatic monomer within the polyolefin resin particles; and d) polymerizing said vinyl aromatic monomer in said polyolefin resin particles to form said interpolymer resin particles having a gel content ranging from about 0 to about 1.5% by weight, based on the weight of the interpolymer resin particles.

The invention provides a process for producing articles with improved processability and/or ESCR characteristics by using the process in the above paragraph to produce interpolymer particles and using these particles in polymer processing techniques such as those described herein.

According to a further aspect of the invention, there are provided interpolymer resin particles containing from about 20% to 80% by weight of polyolefin particles and from about 20 to 80% by weight of polymerized vinyl aromatic monomer and which particles have a gel content ranging from about 0 to about 1.5% by weight, based on the weight of the interpolymer resin particles.

In the invention, the degree of cross-linking of the polyolefin in the interpolymer resin particles is minimal or eliminated. This can be accomplished by eliminating the use of the high temperature cross-linking agent, e.g., dicumyl peroxide for the polyolefin, e.g., polyethylene. The result is an interpolymer resin having a gel content ranging from 0 to 1.5% by weight based on the weight of the interpolymer resin particles. This feature of the invention in conjunction with the interpolymer particles having a VICAT softening temperature ranging from about 85° C. to about 115° C. and a resultant melt index ranging from about 0.2 to about 35.0 g/10 minutes (230° C./5.0 kg) improves the processing characteristics or the processability of the interpolymer resins.

The interpolymer resin particles preferably do not contain a blowing agent that is impregnated in the resin particles through a further suspension process. Therefore, the resultant interpolymer resin particles are not expandable or foamable particles as those of the above prior art for use in foam moldings.

The interpolymer resin particles are generally intended to be used to produce articles through polymer processing techniques, such as sheet extrusion, injection molding, thermoforming, compression molding, blown film extrusion, rotomolding, and direct-injection foamed sheet extrusion at low power consumption and no melt fracture. A sheet or layer formed from the interpolymer particles of the invention may be used as a tie layer in multi-layer structures.

Unlike the interpolymer particles of the prior art, the interpolymer particles of the invention are easily extruded into solid sheets, films, etc. and injection molded into articles with improved solvent resistance (ESCR) compared to articles made solely from polystyrene or polyethylene. The flexural and tensile properties of the articles formed from the interpolymer resin particles of the invention have values that range between those values for articles made solely from polystyrene and those values for articles made solely from low-density polyethylene, while the thermal and impact properties approach that of pure polystyrene.

The interpolymer resin particles of the invention are particularly advantageous in end-use to applications such as solid sheets, foamed sheets, foamed boards, injection molded articles, barrier films, and as a tie layer in multi-layer structures. In a multi-layer structure, the adjacent layer or layers are generally polyethylene, polystyrene or high impact polystyrene. These formed articles have improved properties such as those discussed in the preceding paragraph.

The interpolymer particles may be easily adapted to foam applications where a blowing agent is mixed into the molten interpolymer resin particles in conventional extrusion foaming equipment to produce foamed sheet or foamed board with improved cushioning and improved ESCR properties compared to polystyrene foamed sheet or foamed board applications. U.S. Pat. No. 6,166,099 issuing to Steven M. Krupinski (NOVA Chemicals Inc., assignee) on Dec. 26, 2000 teaches in columns 7 and 8, a conventional extrusion process and related equipment, which may be used for foam applications of the interpolymer resin particles, the teachings of which are incorporated herein by reference.

According to a further aspect of the invention, the resin particles may be used for the fabrication of articles via (extrusion or injection) blow molding, injection molding, rotomolding, profile extrusion, solid sheet extrusion, thermoforming, and direct-injection foamed sheet extrusion.

A still further aspect of the invention is to provide a polymer composition containing the interpolymer particles and a second polymer such as polyethylene and polystyrene.

It is therefore, an object of the present invention to provide interpolymer resin particles or a polymer composition containing the interpolymer particles that result in improved processability to form articles with improved ESCR characteristics, improved vapor barrier characteristics, and/or improved physical properties.

It is a further object of the present invention to provide interpolymer resin particles that have little or no gel content, i.e., ranging from about 0 to about 1.5% by weight based on the weight of the interpolymer resin particles.

These and other objects of the present invention will be better appreciated and understood by those skilled in the art from single FIGURE and the following description and appended claims.

As used herein, the term "thermoplastic resin" refers to a class of polymers that soften or become liquid when heated and harden when cooled.

In many cases, thermoplastics are high-molecular-weight polymers that can be repeatedly heated and remolded. In many embodiments of the invention, thermoplastic resins include polyolefins and elastomers that have thermoplastic properties.

The term "polyolefin" as used herein refers to polyethylene, polypropylene, thermoplastic olefins (TPO's), thermoplastic elastomers (TPE's) resins or plastomers. In many aspects of the invention, the polyolefin is a polyethylene resin or polypropylene resin. The polyolefins can be homogeneous or heterogeneous or blends thereof; can be linear or substantially linear or blends thereof; and can contain short chain branches or long chain branches or blends thereof, combinations of any of the above as these terms are known in the art.

The term "polyethylene resin" as used in the present specification and the appended claims, is meant to include not only a homopolymer of ethylene, but also an ethylene copolymer composed of at least 50 mole %, preferably at least 70 mole %, of an ethylene unit and a minor proportion of a monomer copolymerizable with ethylene, and a blend of at least 50% by weight, preferably at least 60% by weight, of the ethylene homopolymer or copolymer with another polymer.

As used herein, the term "intercalated" refers to the insertion of one or more polymer molecules within the domain of one or more other polymer molecules having a different composition. In embodiments of the invention, as described herein below, styrenic polymers are inserted into polyolefin particles by polymerizing a styrenic monomer mixture within the polyolefin particles.

Unless otherwise specified, all molecular weight values are determined using gel permeation chromatography (GPC). Typically, the GPC analysis is done using an instrument sold under the tradename "Waters 150c". For polystyrene, the samples are dissolved in toluene, which is the mobile phase, and the results compared against appropriate polystyrene standards. For polyethylene, the samples are dissolved in 1,2,4-trichlorobenzene, the mobile phase at 140° C. The samples are prepared by dissolving the polymer in this solvent and run without filtration. Molecular weights are expressed as polyethylene equivalents with a relative standard deviation of 2.9% for the number average molecular weight ("Mn") and 5.0% for the weight average molecular weight ("Mw"). Unless otherwise indicated, the molecular weight values indicated herein are weight average molecular weights (Mw).

Examples of monomers copolymerizable with ethylene are vinyl acetate, vinyl chloride, propylene, butene, hexene, octene, acrylic acid and its esters, methacrylic acid and its esters. The other polymer that may be blended with the ethylene homopolymer or copolymer may be any polymer compatible with it. Examples are polypropylene, polybutadiene, polyisoprene, polychloroprene, chlorinated polyethylene, polyvinyl chloride, a styrene/butadiene copolymer, a vinyl acetate/ethylene copolymer, an acrylonitrile/butadiene copolymer, a vinyl chloride/vinyl acetate copolymer, etc. Especially preferred species are polypropylene, polybutadiene and styrene/butadiene copolymer.

Examples of polyethylene that can be advantageously employed in the present invention are low-, medium-, and high-density polyethylene, an ethylene vinyl acetate copolymer, an ethylene/propylene copolymer, a blend of polyethylene and polypropylene, a blend of polyethylene and an ethylene/vinyl acetate copolymer, and a blend of polyethylene and an ethylene/propylene copolymer.

The polyethylene resin particles used to form the interpolymer resin particles of the invention have a melt index (MI) of about 2.1 g/10 minutes under 190° C./2.16 kg conditions (equivalent to 11.9 g/10 minutes under 230° C./5.0 kg conditions) (ASTM D1238); a number average molecular weight of 20,000 to 60,000; an intrinsic viscosity, at 75° C. in xylene, of 0.8 to 1.1; a density of 0.910 to 0.940 g/cm$^3$, and a VICAT softening temperature greater than 85° C. In the embodiments herein, the polyethylene resin particles have a VICAT softening temperature of about 94° C., a melt index (MI) of 2.1 g/10 minutes (190° C./2.16 kg) a density of 0.919 g/cm$^3$, and a weight of about 20 milligrams.

A suitable low-density polyethylene (LDPE) is that obtained from NOVA Chemicals Inc. under the trade name LA-0218-AF.

The term "polypropylene resin" as used herein is meant to denote not only a homopolymer of propylene, but also a block copolymer containing polypropylene in an amount of at least 50% by weight and another polyolefin, and a mixture of at least 50% by weight of polypropylene and another polyolefin. In the present invention, the other polyolefin includes, for example, polyethylene, an ethylene/vinyl acetate copolymer, an ethylene/vinyl chloride copolymer, an ethylene/propylene rubber, polyisobutylene, butyl rubber, styrene/butadiene rubber, polybutene, and polybutadiene. Similar to the teachings of Kajimura, et al. U.S. Pat. No. 4,303,757, the polypropylene resin can be used in particulate form, preferably, in the form of spheres, flattened particles or pellets having a diameter of about 0.5 to 10 mm in order to cause rapid absorption of the vinyl aromatic monomer.

The amount of polyolefin used in the invention ranges from about 20% to about 80% by weight based on the weight of the interpolymer resin particles.

A vinyl aromatic monomer is used in the invention. Examples of vinyl aromatic monomers are styrene, α-methylstyrene, ethylstyrene, chlorostyrene, bromostyrene, vinyltoluene, vinylbenzene, and isopropylxylene. These monomers may be used either alone or in admixture. A mixture of at least 0.1% of the vinyl aromatic monomer and a monomer copolymerizable with it, such as acrylonitrile, methyl methacrylate, butyl acrylate, or methyl acrylate can also be used. As used herein, the term "vinyl aromatic monomer" means a vinyl aromatic monomer used alone or in admixture.

In an embodiment, the vinyl aromatic monomer preferably is styrene polymerized within the polyolefin resin particles.

The amount of vinyl aromatic monomer ranges from about 20% to about 80% by weight based on the weight of the interpolymer resin particles.

In general, the interpolymer resin particles are formed as follows: in a reactor, the polyolefin resin particles are dispersed in an aqueous medium prepared by adding 0.01 to 5%, preferably 2 to 3%, by weight based on the weight of the water of a suspending or dispersing agent such as water soluble high molecular materials, e.g., polyvinyl alcohol, methyl cellulose, and slightly water soluble inorganic materials, e.g., calcium phosphate or magnesium pyrophosphate, and then the vinyl aromatic monomers are added with free-radical polymerization catalysts to the suspension and polymerized inside the polyolefin resin particles to form an interpenetrating network of polyolefin and vinyl aromatic monomers.

The styrenic polymers are intercalated within the polyolefin resin by polymerizing the vinyl aromatic monomers so that the resulting polymer is formed surrounded by and intermingled with the polyolefin resin.

Basically any of the conventionally known and commonly used suspending agents for polymerization may be employed. These agents are well known in the art and may be freely selected by one skilled in the art. Water is used in an amount generally from 0.7 to 5, preferably 3 to 5 times that of the starting polyolefin particles added to the aqueous suspension, on a weight basis.

When the polymerization of the vinyl aromatic monomer is completed, the polymerized vinyl aromatic resin is uniformly dispersed inside the polyolefin particles.

The resulting interpolymer resin particles may be used as raw materials in producing articles such as sheets, rods, pipes, and film using an extruder, or in producing articles via injection molding, or thermoforming processes. A blowing agent may be introduced into the interpolymer resin particles to form foamed sheet via an extruder.

It has been found by the inventor that unexpected results are derived when the interpolymer particles of the invention are produced without a cross-linking agent. That is, in the suspension process no cross-linking agent such as a high temperature initiator, e.g., dicumyl peroxide is added to the polyolefin, e.g., polyethylene or polypropylene. Since the polyolefin particles are not cross-linked, the interpolymer particles have very little or no gel content, i.e., a gel content ranging from about 0 to about 1.5%, preferably from about 0 to about 0.8% by weight, and more preferably from about 0 to about 0.5% by weight, based on the weight of the particles. The VICAT softening temperature for the interpolymer resin particles ranges from about 85° C. to about 115° C., and preferably from about 90° C. and about 105° C.

The viscosity of the interpolymer particles of the invention is reduced compared to the interpolymer particles of the prior art having relatively high gel content. The reduced viscosity results in improved melt processing characteristics or processability of the particles so that better quality shaped articles can be manufactured by extrusion and/or by injection processes as discussed herein above.

In a direct injection foaming process, a blowing agent may be introduced into a molten mass of the interpolymer particles of the invention to produce a foamed article, such as foam sheet, foam board, etc. Suitable blowing agents include aliphatic hydrocarbons such as n-propane, n-butane, iso-butane, n-pentane, iso-pentane, n-hexane, and neopentane, cycloaliphatic hydrocarbons such as cyclobutane and cyclopentane, and halogenated hydrocarbons such trichlorofluoromethane, dichlorofluoromethane, dichlorodifluoromethane, chlorodifluoromethane and dichlorotetrafluoroethane, etc. HFC's such as tetrafluoroethane, difluoroethane or HCFC's such as chlorodifluoroethane may be used. These blowing agents may be used alone or as mixtures.

A preferred amount of the blowing agent is in a range of about 2 to about 15 by weight based on the weight of the formed interpolymer particles. The specific types of blowing agents are taught in U.S. Pat. No. 3,959,189, the teachings of which are incorporated by reference. Preferably, the interpolymer resin particles are not impregnated with the blowing agent in a suspension process; instead the blowing agent is added during the formation of foam products in a conventional manner and in a conventional extrusion process, more about which is discussed herein after.

A process for producing the interpolymer particles of the invention is conveniently carried out as follows. The polyolefin particles are suspended in an aqueous medium containing a dispersing agent. The dispersing agent may be, for example, polyvinyl alcohol, methylcellulose, calcium phosphate, magnesium pyrophosphate, calcium to carbonate, tricalcium phosphate, etc. The amount of dispersing agent employed is 0.01 to 5% by weight based on the amount of water.

A surfactant may be added to the aqueous medium. Generally, the surfactant is used to lower the surface tension of the suspension and to help emulsify the water/vinyl aromatic monomer mixture in the initiator and wax mixes, if used. The aqueous medium is generally heated to a temperature at which the vinyl aromatic monomer can be polymerized, i.e., from about 60° C. to about 120° C. over a period of time, for example, 12 to 20 hours. Over this 12 to 20 hour period, the vinyl aromatic monomer and the low temperature initiators for polymerizing the vinyl aromatic monomer are added to the resulting suspension containing the polyolefin particles dispersed therein. These materials may be added all at one time, or gradually in small portions. The suspension is cooled to room temperature. The interpolymer particles are acidified to remove surface suspending agent, dewatered, screened, and dried in a fluidized bed dryer.

Polymerization of the vinyl aromatic monomer occurs in the polyolefin particles. Examples of suitable initiators include organic peroxy compounds, such as peroxides, peroxy carbonates and peresters. Typical examples of these peroxy compounds are $C_{6-20}$ acyl peroxides, such as decanoyl peroxide, benzoyl peroxide, lauroyl peroxide, octanoyl peroxide, stearyl peroxide, peresters, such as t-butyl perbenzoate, t-butyl peracetate, t-butyl perisobutyrate, t-butylperoxy 2-ethylhexyl carbonate, or combinations thereof. Other initiators, different from peroxy compounds, are also possible, as for example $\alpha,\alpha'$-azobisisobutyronitrile and azobisdimethylvaleronitrile.

The initiators are generally used in an amount of about 0.05 to 2 percent by weight, preferably 0.1 to 1 percent by weight, based on the weight of the vinyl aromatic monomer.

These initiators may be used alone or in combination of two or more initiators. These initiators can be dissolved in the vinyl aromatic monomers, which are to be absorbed in the polyolefin particles. These teachings appear in the aforesaid U.S. Pat. No. 3,959,189. The initiators can be dissolved in a solvent. Such solvents include toluene, benzene and 1,2-dichloropropane, etc.

The suspension polymerization is carried out in the presence of suspension stabilizers. Suitable suspension stabilizers are well known in the art and include organic stabilizers, such as poly(vinyl alcohol), gelatine, agar, polyvinyl pyrrolidine, polyacrylamide; inorganic stabilizers, such as alumina, bentonite, magnesium silicate; surfactants, such as sodium dodecyl benzene sulfonate; or phosphates, like tricalciumphosphate, disodium-hydrogen phosphate, optionally in combination with any of the stabilizing compounds mentioned earlier.

The amount of stabilizer may suitably vary from about 0.01% to about 5.0% by weight, based on the weight of the aqueous phase.

The polyolefin particles, and/or the interpolymer resin particles of the invention may contain an anti-static additive; a flame retardant; a colorant or dye; a filler material; stabilizers; and plasticizers, such as white oil.

The interpolymer resin particles of the invention may suitably be coated with compositions containing silicones, metal or glycerol carboxylates, suitable carboxylates are glycerol mono-, di- and tri-stearate, zinc stearate, calcium stearate, and magnesium stearate; and mixtures thereof. Examples of such compositions may be those disclosed in GB Patent No. 1,409,285 and in Stickley U.S. Pat. No. 4,781,983. The coating composition can be applied to the interpolymer resin particles via dry coating or via a slurry or solution in a readily vaporizing liquid in various types of batch and continuous mixing devices. The coating aids in transferring the interpolymer resin particles easily through the processing equipment.

The interpolymer resin particles may contain other additives such as chain transfer agents, suitable examples including $C_{2-15}$ alkyl mercaptans, such as n-dodecyl mercaptan, t-dodecyl mercaptan, t-butyl mercaptan and n-butyl mercaptan, and other agents such as pentaphenyl ethane and the dimer of $\alpha$-methyl styrene, as well as nucleating agents, such as polyolefin waxes. The polyolefin waxes, i.e., polyethylene waxes, have a weight average molecular weight of 250 to 5,000, which are typically finely divided through the polymer matrix in a quantity of 0.01 to 2.0% by weight, based on the amount of resin composition. The interpolymer resin particles may also contain from 0.1 to 0.5% by weight, talc, organic bromide-containing compounds, and polar agents as described in e.g., WO 98/01489 which comprise isalkylsulphosuccinates, sorbital-$C_8$-$C_{20}$-carboxylates, and $C_8$-$C_{20}$-alkylxylene sulphonates.

The interpolymer resin particles may be used in extrusion processing. For example, the particles may be fed into an extruder, and then extruded as a single layer or co-extruded into multi-layer structures, e.g., sheet or film. Optionally, a blowing agent may be forced into the particles passing through the extruder and a foamed sheet, board, or rod may be formed. In further embodiments, the interpolymer resin particles may be used in injection molding or may be thermoformed into desired shapes in a manner well known to those skilled in the art.

Alternatively, an extruded sheet or film produced from the interpolymer resin particles may be used as a tie layer in a multi-layer structure.

A co-extrusion process may be employed wherein the interpolymer resin particles are extruded between sheets of incompatible polymers, e.g., a sheet made of polystyrene or polystyrene and rubber, e.g., high impact polystyrene (HIPS), and a sheet made of polyethylene, thereby giving improved adhesion to the multi-layer structure. It is hypothesized that the polyethylene resin in the interpolymer resin particles creates a chemical bond with the polyethylene in the polyethylene layer and that the polystyrene in the interpolymer resin particles creates a chemical bond with the polystyrene in the polystyrene layer.

This improved adhesion becomes important when a cap layer of polyethylene is extruded onto polystyrene sheet to improve ESCR, i.e., environmental stress crack resistance. A further example may pertain to the food industry where in view of FDA requirements food cannot come into contact with the substrate layer of the food container.

When polypropylene is used as the base polyolefin resin in the interpolymer particles of the invention, it may be preferable to viscbreak the polypropylene prior to, during or after interpolymer formation.

Viscbreaking is the intentional chain scission of polypropylene to produce lower molecular weight, a narrower molecular weight distribution, a slow crystallization rate, and faster molecular relaxation time in the molten state. Viscbreaking can be accomplished by extrusion under high shear to mechanically degrade the higher molecular weight chains as taught in the above Fudge U.S. Pat. Nos. 4,622,347 and 4,677,134 or can be accomplished by the use of peroxides as taught in the aforesaid Fudge U.S. Pat. No. 4,692,471 during the formation of the interpolymer resin particles. The peroxide blended with the polymers may be any of the compounds having a 10-hour half-life temperature of between 100° C. and 130° C. such as dicumyl peroxide (117° C.) or 1,3-bis($\alpha$-tert-butylperoxyisopropyl)benzene (116° C.). Examples 7 and 8 use dicumyl peroxide to viscbreak the polypropylene of the interpolymer resin particles of the invention.

The interpolymer resin particles of the invention may be combined with a second polymer to form a polymer blend composition which may then be used to form articles via processing, for example, sheet extrusion, rotomolding, thermoforming, compression molding, injection molding, and blown film extrusion. The second polymer may be selected from the group consisting of polyolefins and polystyrene. In this composition, the interpolymer resin particles may be present in an amount ranging from about 0.1% by weight to about 99.9% by weight and the second polymer may be present in an amount ranging from about 99.9% by weight to about 0.1% by weight based on the polymer blend composition. In an embodiment of the invention, the interpolymer resin particles are present in an amount ranging from about 10% by weight to about 90% by weight and the second polymer is present in an amount ranging from about 90% to about 10% by weight based on the weight of the interpolymer resin.

Broadly, the second polymer can be a polyolefin selected from polyethylene; polypropylene; copolymers of ethylene and an olefinic monomer; copolymers of one or more olefinic monomers and one or more $C_1$-$C_4$ alkyl(meth)acrylates; copolymers of one or more olefinic monomers and acrylonitrile; copolymers of one or more olefinic monomers and vinyl acetate; copolymers of one or more olefinic monomers and butadiene; copolymers of one or more olefinic monomers and isoprene; copolymers of one or more olefinic monomers and styrene, and combinations thereof.

In some embodiments of the invention, when the second polymer includes a polyolefin, the polyolefin can be one or more polymers selected from ethylene-vinyl acetate copolymers, HDPE, LDPE, LLDPE, VLDPE, polypropylene, thermoplastic olefins, thermoplastic elastomers resins, ethylene copolymers and combinations thereof.

In other embodiments of the invention, the second polymer polyolefin can be a homopolymer of an α-olefin or a copolymer of two or more α-olefins. In particular embodiments, the polyolefin includes one or more polymers selected from polyethylene, polypropylene, and copolymers of ethylene and/or propylene with 1-butene, 1-hexene, 1-octene and combinations thereof.

In particular embodiments of the invention, the interpolymer resin particles are present in the polymer blend composition at a level of at least about 0.1 wt %, in some cases at least about 0.5 wt. %, and in other cases at least about 1 wt. % and can be up to about 40 wt. %, in some cases up to about 60 wt. %, in some cases up to about 30 wt. %, in other cases up to about 25 wt. %, in some instances up to about 20 wt. %, in other instances up to about 15 wt. % and in some situations up to about 10 wt. % of the polymer blend composition. The amount of interpolymer resin particles in the polymer blend composition will vary depending on the particular second polymer in the polymer blend composition and the end use. The amount of interpolymer resin particles in the polymer blend composition can be any value or range between any of the values recited above.

In these particular embodiments, the second polymer is present in the polymer blend composition at a level of at least about 60 wt. %, in some cases at least about 70 wt. %, and in other cases at least about 75 wt. %, in some instances at least about 80 wt. %, in other instances at least about 85 wt. % and in some situations at least about 90 wt. % and can be up to about 99.9 wt. %, in some cases up to about 99.5 wt. % and in other cases up to about 99 wt. % of the polymer blend composition. The amount of second polymer in the polymer blend composition will vary depending on the particular second polymer and the end use. The amount of second polymer in the polymer blend composition can be any value or range between any of the values recited above.

In some embodiments of the invention, the polymer blend composition can be made by preparing a first blend of the interpolymer resin particles with one or more second polymers and then blending the first blend into one or more second polymers that can be the same or different than the second polymer in the first blend.

The polymer blend composition can optionally include, depending on its intended use, additives and adjuvants, which can include, without limitation, anti-blocking agents, antioxidants, anti-static additives, activators, biodegradation enhancers, zinc oxide, chemical foaming agents, colorants, dyes, filler materials, flame retardants, heat stabilizers, impact modifiers, light stabilizers, light absorbers, lubricants, nucleating agents, pigments, plasticizers, processing aids, slip agents, softening agents, and combinations thereof.

Suitable anti-blocking agents, slip agents and lubricants include without limitation silicone oils, liquid paraffin, synthetic paraffin, mineral oils, petrolatum, petroleum wax, polyethylene wax, hydrogenated polybutene, higher fatty acids and the metal salts thereof, linear fatty alcohols, glycerine, sorbitol, propylene glycol, fatty acid esters of monohydroxy or polyhydroxy alcohols, phthalates, hydrogenated castor oil, beeswax, acetylated monoglyceride, hydrogenated sperm oil, ethylenebis fatty acid esters, and higher fatty amides. Suitable lubricants include, but are not limited to, ester waxes such as the glycerol types, the polymeric complex esters, the oxidized polyethylene type ester waxes and the like, metallic stearates such as barium, calcium, magnesium, zinc and aluminum stearate, salts of 12-hydroxystearic acid, amides of 12-hydroxystearic acid, stearic acid esters of polyethylene glycols, castor oil, ethylene-bis-stearamide, ethylene bis cocamide, ethylene bis lauramide, pentaerythritol adipate stearate and combinations thereof in an amount of from 0.1 to 2 wt. % of the polymer blend composition.

Suitable antioxidants include without limitation Vitamin E, citric acid, ascorbic acid, ascorbyl palmitrate, butylated phenolic antioxidants, tert-butylhydroquinone (TBHQ) and propyl gallate (PG), butylated hydroxyanisole (BHA), butylated hydroxytoluene (BHT), and hindered phenolics such as IRGANOX® 1010 and IRGANOX 1076 available from Ciba Specialty Chemicals Corp., Tarrytown, N.Y.

Suitable anti-static agents include, without limitation, glycerine fatty acid, esters, sorbitan fatty acid esters, propylene glycol fatty acid esters, stearyl citrate, pentaerythritol fatty acid esters, polyglycerine fatty acid esters, and polyoxyethylene glycerine fatty acid esters in an amount of from 0.01 to 2 wt. % of the polymer blend composition.

Suitable colorants, dyes and pigments are those that do not adversely impact the desirable physical properties of the polymer blend composition include, without limitation, white or any colored pigment. In embodiments of the invention, suitable white pigments contain titanium oxide, zinc oxide, magnesium oxide, cadmium oxide, zinc chloride, calcium carbonate, magnesium carbonate, kaolin clay and combinations thereof in an amount of 0.1 to 20 wt. % of the polymer blend composition. In embodiments of the invention, the colored pigment can include carbon black, phthalocyanine blue, Congo red, titanium yellow or any other colored pigment typically used in the printing industry in an amount of 0.1 to 20 wt. % of the polymer blend composition. In embodiments of the invention, the colorants, dyes and pigments include inorganic pigments including, without limitation, titanium dioxide, iron oxide, zinc chromate, cadmium sulfides, chromium oxides and sodium aluminum silicate complexes. In embodiments of the invention, the colorants, dyes and pigments include organic type pigments, which include without limitation, azo and diazo pigments, carbon black, phthalocyanines, quinacridone pigments, perylene pigments, isoindolinone, anthraquinones, thio-indigo and solvent dyes.

Suitable fillers are those that do not adversely impact, and in some cases enhance, the desirable physical properties of the polymer blend composition. Suitable fillers, include, without limitation, talc, silica, alumina, calcium carbonate in ground and precipitated form, barium sulfate, talc, metallic powder, glass spheres, barium stearate, calcium stearate, aluminum oxide, aluminum hydroxide, glass, clays such as kaolin and montmorolites, mica, silica, alumina, metallic powder, glass spheres, titanium dioxide, diatomaceous earth, calcium stearate, aluminum oxide, aluminum hydroxide, carbon nanotubes and fiberglass, and combinations thereof can be incorporated into the polymer composition in order to reduce cost or to add desired properties to the polymer blend composition. The amount of filler is desirably less than 10% of the total weight of the polymer blend composition as long as this amount does not alter the properties of the polymer blend composition.

Suitable flame retardants include, without limitation, brominated polystyrene, brominated polyphenylene oxide, red phosphorus, magnesium hydroxide, magnesium carbonate, antimony pentoxide, antimony trioxide, sodium antimonite, zinc borate and combinations thereof in an amount of 0.1 to 2 wt. % of the polymer blend composition.

Suitable heat stabilizers include, without limitation, phosphite or phosphonite stabilizers and hindered phenols, non-limiting examples being the IRGANOX® stabilizers and antioxidants available from Ciba Specialty Chemicals. When used, the heat stabilizers are included in an amount of 0.1 to 2 wt. % of the polymer blend composition.

Suitable impact modifiers include, without limitation, high impact polystyrene (HIPS), SEEPS, ethylene-methacrylate resins (EMA), styrene/butadiene block copolymers, ABS, copolymers of $C_1$-$C_{12}$ linear, branched or cyclic olefins, $C_1$-$C_{12}$ linear, branched or cyclic alkyl esters of (meth)acrylic acid, styrenic monomers, styrene/ethylene/butadiene/styrene block copolymers, styrene/ethylene copolymers. The amount of impact modifier used is typically in the range of 0.5 to 25 wt. % of the polymer blend composition.

Suitable ultra-violet light (UV) stabilizers include, without limitation, 2-hydroxy-4-(octyloxy)-benzophenone, 2-hydroxy-4-(octyl oxy)-phenyl phenyl-methanone, 2-(2'-hydroxy-3,5'-di-tetramethylphenyl)benzotriazole, and the family of UV hindered amine stabilizers available under the trade TINUVIN® from Ciba Specialty Chemicals Co., Tarrytown, N.Y., in an amount of 0.1 to 2 wt. % of the polymer blend composition.

Suitable ultraviolet light absorbers, include without limitation, 2-(2-hydroxyphenyl)-2H-benzotriazoles, for example, known commercial hydroxyphenyl-2H-benzotriazoles and benzotriazoles hydroxybenzophenones, acrylates, malonates, sterically hindered amine stabilizers, sterically hindered amines substituted on the N-atom by a hydroxy-substituted alkoxy group, oxamides, tris-aryl-o-hydroxyphenyl-s-triazines, esters of substituted and unsubstituted benzoic acids, nickel compounds, and combinations thereof, in an amount of 0.1 to 2 wt. % of the polymer blend composition.

Suitable softening agents and plasticizers include, without limitation, cumarone-indene resin, d-limonene, terpene resins, and oils in an amount of about 2 parts by weight or less based on 100 parts by weight of the polymer blend composition.

In embodiments of the invention, the components of the polymer blend composition are combined into a homogenous mixture by any suitable technique, which can include without limitation, mixing extrusion (compounding) and milling. The polymer blend composition components are then blended in the form of granules or in powder form, according to the types of components, in a blender before plastification and homogenization. Blending may be effected in a discontinuous process working with batches or in a continuous process.

In embodiments of the invention, the components can be mixed, for example, in an internal mixer of Banbury type, in a single or twin-screw co-rotary or counter-rotary extruder, or in any other mixer capable of supplying sufficient energy to melt and fully homogenize the mixture.

In particular embodiments of the invention, production of the mixture resulting from the composition can be done by mixing extrusion (compounding) in a twin-screw extruder. Such a mixture must be a uniform and homogenous mixture.

In embodiments of the invention, the mixed polymer blend composition is extruded into pellets obtained by cutting under cooling water; the pellets, which will be stored for subsequent conversion into items and parts. The conversion techniques used are those of plastics processing such as, in particular, injection if a cover is involved, and having very different wall thicknesses between the tear start zone and the support and fitting structural zone.

In embodiments of the invention, the polymer blend compositions can be extruded directly into sheet, or film, or any article, without having to go through a pelletization step.

In some embodiments of the invention, the polymer blend film includes one or more layers of a multilayer film structure.

In embodiments of the invention, the components of the polymer blend composition including any optional additives can be combined by melt blending.

In other embodiments of the present method, either method can include adding the polymer blend composition to a first extruder and then combining with the optional additives in a second extruder.

Regardless of which method is used, during the blending step, the second polymer and interpolymer resin particles are typically intimately mixed by high shear mixing to form the polymer blend composition where the mixture includes a continuous second polymer phase and an interpolymer resin particulate dispersed phase. The dispersed interpolymer resin particles are suspended or dispersed throughout the second polymer continuous phase. The manufacture of the dispersed interpolymer resin particulate phase within the second polymer continuous phase can require substantial mechanical input. Such input can be achieved using a variety of mixing means including extruder mechanisms where the materials are mixed under conditions of high shear until the appropriate degree of wetting, intimate contact and dispersion are achieved.

In some embodiments of the invention, the polymer composition film comprises one or more layers of a multilayer film structure. In particular embodiments, a first layer, which is situated between a second layer and a third layer, contains the blend of a polyolefin and interpolymer resin particles as described herein. The second layer directly contacts a first surface of the first layer and includes a first thermoplastic resin. The third layer directly contacts a second surface of the first layer and includes a second thermoplastic resin. The first thermoplastic resin can be the same or different than the second thermoplastic resin.

In embodiments of the invention, blends of the interpolymer resin particles according to the invention and second polymer provide improved processing and physical properties compared to the second polymer alone.

As non-limiting examples, blown and extruded films of the interpolymer resin particle—second polymer blends, when compared to the second polymer alone demonstrate improved throughput and processability, improved Dart impact properties, improved modulus, improved tensile properties and improved elongation properties.

The following examples are intended to aid in understanding the present invention, however, in no way, should these examples be interpreted as limiting the scope thereof.

EXAMPLES

Example 1

This Example 1 relates to styrene-polyethylene interpolymer resin particles comprised of 60% by weight polystyrene and 40% by weight of low-density polyethylene, based on the weight of the interpolymer resin particles.

A mixture of 520 pounds of de-ionized water, 9.6 pounds of tri-calcium phosphate as a suspending agent, and 27 grams of a strong anionic surfactant were charged to a polymerization reactor with the agitator running at 88 rpm to prepare an aqueous medium. The surfactant was Nacconol® 90 (Stephan Chemical Co.), which is sodium n-dodecyl benzene sulfonate. The aqueous medium was heated to about 91° C. and held for about 10 minutes. Then 112 pounds of low density polyethylene (LDPE) pellets (LA-0218-AF from NOVA Chemicals Inc.), each weighing about 20 milligrams, having a melt index of 2.1 g/10 minutes (190° C./2.16 kg), and a VICAT softening point of about 93° C. were added to the aqueous medium. This suspension of beads and water continued to be stirred at 88 rpm. The low temperature polystyrene initiators, i.e., 373 grams of benzoyl peroxide (BPO) (75% active) and 70 grams of tertiary butyl perbenzoate (TBP) were dissolved in 84 pounds of styrene monomer to prepare a monomer solution, and this mixture was pumped into the reactor over 200 minutes. A second batch of 84 pounds of pure styrene was then added to the reactor over 100 minutes at a temperature of 91° C. The reactor contents were held at 91° C. for an additional 90 minutes to allow the styrene to soak into and react within the polyethylene. Then the reactor contents were heated to 140° C. over 2 hours and held for an additional 4 hours to polymerize the remaining styrene into polystyrene within the polyethylene matrix.

After polymerization, the reactive mixture was cooled and hydrochloric acid was added to dissolve the suspending agents. The resin particles were then washed and dried.

The average gel content for two samples of the resin particles was 0.65 weight % based on the weight of the formed interpolymer resin particles. The melt index was 1.046 g/10 minutes (230° C./5.0 kg).

Example 2

This Example 2 relates to interpolymer styrene-polyethylene interpolymer resin particles comprised of 70% by weight polystyrene and 30% by weight low-density polyethylene, based on the weight of the interpolymer resin particles.

A mixture of 520 pounds of deionized water, 9.6 pounds of tri-calcium phosphate as a suspending agent, and 27 grams of a strong anionic surfactant (Nacconol® 90) were charged to a polymerization reactor with the agitator running at about 88 rpm to prepare an aqueous medium. The aqueous medium was heated to about 91° C. and held for about 10 minutes. Then 84 pounds of low-density polyethylene pellets (LA-0218-AF) were suspended in the aqueous medium. The suspension continued to be stirred at 88 rpm. The low temperature polystyrene initiators, i.e., 356 grams of benzoyl peroxide (BPO) and 66.8 grams of tertiary butyl perbenzoate (TBP) were dissolved in 98 pounds of styrene monomer to prepare a monomer solution, and this mixture was pumped into the reactor over 200 minutes. A second batch of 98 pounds of pure styrene was then added to the reactor over 100 minutes at a temperature of 91° C. The reactor contents were held at 91° C. for an additional 90 minutes to allow the styrene to soak into and react within the polyethylene. Then the reactor contents were heated to 140° C. over 2 hours and held at this temperature for an additional 4 hours to polymerize the remaining styrene into polystyrene within the polyethylene matrix.

After polymerization, the reactive mixture was cooled and hydrochloric acid was added to dissolve the suspending agents. The resin particles were then washed and dried.

The average gel content for two samples of resin particles was 0.45% by weight based on the weight of the particles. The melt index was 0.501 g/10 minutes at (230° C./5.0 kg).

Example 3

This Example 3 relates to styrene-polyethylene interpolymer resin particles comprised of 50% by weight polystyrene and 50% by weight low-density polyethylene, based on the weight of the interpolymer resin particles.

A mixture of 520 pounds of de-ionized water, 9.6 pounds of tri-calcium phosphate as a suspending agent, and 27 grams of a strong anionic surfactant (Nacconol® 90) were charged to a polymerization reactor with the agitator running at about 88 rpm to prepare an aqueous medium. The aqueous medium was heated to about 91° C. and held for about 10 minutes. Then 140 pounds of low-density polyethylene pellets (LA-0218-AF) were suspended in the aqueous medium. The suspension continued to be stirred at 88 rpm. The low temperature polystyrene initiators, i.e., 350 grams of benzoyl peroxide (BPO) and 65.63 grams of tertiary butyl perbenzoate (TBP), were dissolved in 70 pounds of styrene monomer to prepare a monomer solution, and this mixture was pumped into the reactor over 200 minutes. A second batch of 70 pounds of pure styrene was then added to the reactor over 100 minutes at a temperature of 91° C. The reactor contents were held at 91° C. for an additional 90 minutes to allow the styrene to soak into and react within the polyethylene. Then the reactor contents were heated to 140° C. over 2 hours and held for an additional 4 hours to polymerize the remaining styrene into polystyrene within the polyethylene matrix. After polymerization, the reactive mixture was cooled and hydrochloric acid was added to dissolve the suspending agents. The resin particles were then washed and dried.

The average gel content for two samples of resin particles was 0.69% by weight based on the weight of the formed interpolymer resin particles. The melt index was 1.022 g/10 minutes (230° C./5.0 kg).

Example 4

This Example 4 is similar to Example 1 in that a styrene-polyethylene interpolymer with 60% by weight polystyrene and 40% by weight low density polyethylene based on the weight of the interpolymer particles was produced. In this Example 4, however, a chain transfer agent was used in an attempt to increase the melt flow rate of the interpolymer resin.

α-methyl styrene dimer (a chain transfer agent) in an amount of 163 grams, i.e., about 0.20 parts per hundred of styrene was added to the suspension with the benzoyl peroxide (BPO) and the tertiary butyl perbenzoate (TBP).

The average gel content for two samples of the resin particles was 1.01% by weight based on the weight of the formed interpolymer resin particles. The melt index was 2.688 g/10 minutes (230° C./5.0 kg). These results demonstrate that when using a chain transfer agent without a cross-linking agent the melt index was increased compared to Example 1.

Example 5

In this Example 5, interpolymer resin particles were produced comprising 60% by weight polystyrene and 40% by weight ethylene vinyl acetate copolymer (EVA), based on the weight of the resin particles. No high temperature cross-linking agent, i.e., dicumyl peroxide initiator was added.

A mixture of 380 pounds of de-ionized water, 13 pounds of tri-calcium phosphate as a suspending agent, and 8.6 grams of Nacconol® 90 anionic surfactant were charged to a polymerization reactor with the agitator running at about 102 rpm to prepare an aqueous medium.

The aqueous medium was heated to about 60° C. and held for about 30 minutes. Then 125 pounds of a low-density polyethylene vinyl acetate (EVA) pellets containing 4.5% by weight vinyl acetate and 95.5% by weight ethylene (NA 480 from Equistar Chemicals, LP, Houston, Tex.) and having a density of about 0.923 g/cc and a melt index of 0.25 g/10 minutes (190° C./2.16 kg) were suspended in the aqueous medium. The reactor temperature was increased to 85° C. The low temperature polystyrene initiators, i.e., 246 grams of benzoyl peroxide (BPO) and 30 grams of tertiary butyl perbenzoate (TBP), were dissolved in 22.6 pounds of styrene monomer to prepare a monomer solution, and this mixture was pumped into the reactor over 96 minutes. A second batch of 146 pounds of pure styrene and 5.0 lbs of butyl acrylate was then added to the reactor over 215 minutes. Then the reactor contents were heated and held at 140° C. for over 8 hours to finish the polymerization of styrene within the polyethylene matrix.

After polymerization was completed, the reactive mixture was cooled and removed to a wash kettle where muriatic acid (HCl) was added to dissolve the suspending agents from the pellet surfaces. The pellets were then washed and dried.

The average gel content for two samples of the resin pellets was 0.46 weight % based on the weight of the formed interpolymer resin particles. The melt index of the pellets was 0.21 g/10 minutes (230° C./5.0 kg).

Example 6

This Example 6 relates to interpolymer resin particles comprising 70% by weight polystyrene based on the weight of the interpolymer resin particles, and 30% by weight of ethylene vinyl acetate copolymer (EVA). The process for making the particles was similar to that for Example 5. The low-density polyethylene vinyl acetate (EVA) used in Example 5 was the same as used in Example 6.

A mixture of 411 pounds of de-ionized water, 9.8 pounds of tri-calcium phosphate as a suspending agent, and 6.5 grams of anionic surfactant (Nacconol® 90) were charged to a polymerization reactor with the agitator running at about 102 rpm to prepare an aqueous medium. The aqueous medium was heated to about 60° C. and held for about 30 minutes. Then 87 pounds of the low-density ethylene vinyl acetate pellets were suspended in the aqueous medium. The reactor temperature was increased to 85° C. The low temperature polystyrene initiators, i.e., 246 grams of benzoyl peroxide (BPO) and 30 grams of tertiary butyl perbenzoate (TBP), were dissolved in 22.6 pounds of styrene monomer to prepare a monomer solution, and this mixture was pumped into the reactor over 96 minutes. A second batch of 146 pounds of pure styrene and 5.0 lbs of butyl acrylate was then added to the reactor over a period of 215 minutes. Then the reactor contents were heated and held at 140° C. for over 8 hours to finish the polymerization of styrene within the polyethylene matrix.

After polymerization was completed, the reactive mixture was cooled and removed to a wash kettle where muriatic acid (HCl) was added to dissolve the suspending agents from the pellet surfaces. The pellets were then washed and dried.

The average gel content for two samples of the resin pellets was 0.32% by weight based on the weight of the formed interpolymer resin particles. The melt index of the pellets was 0.25 g/10 minutes (230° C./5.0 kg).

Examples 7 and 8 below show that the use of dicumyl peroxide for viscbreaking purposes increases the melt index of the resin.

Example 7

This Example 7 relates to interpolymer resin particles comprising 60% by weight polystyrene based on the weight of the interpolymer resin particles, and 40% by weight of polypropylene. Dicumyl peroxide was added to viscbreak the polypropylene.

A mixture of 520 pounds of deionized water, 9.6 pounds of tri-calcium phosphate as a suspending agent, and 27 grams of Nacconol 90 were charged to a polymerization reactor with the agitator running at about 88 rpm to prepare an aqueous medium. The aqueous medium was heated to about 91° C. and held for about 10 minutes. Then 112 pounds of polypropylene pellets (Huntsman P5M4K-046), each weighing about 20 milligrams and having a MI of 25.5 g/10 minutes (230° C./5.0 kg) were suspended in the aqueous medium. The suspension continued to be stirred at 88 rpm. The low temperature polystyrene initiators, i.e., 473 grams of benzoyl peroxide (BPO) and 145 grams of tertiary butyl perbenzoate (TBP), and 173 grams of dicumyl peroxide (for viscbreaking the polypropylene) were dissolved in 84 pounds of styrene monomer to prepare a monomer solution, and this mixture was pumped into the reactor over 200 minutes. A second batch of 84 pounds of pure styrene was then added to the reactor over 100 minutes at a temperature of 91° C. The reactor contents were held at 91° C. for an additional 90 minutes to allow the styrene to soak into and react with the polypropylene. Then the reactor contents were heated to 140° C. for over 2 hours and held for an additional 4 hours to polymerize the styrene into polystyrene within the matrix of the polyethylene.

After polymerization, the reactive mixture was cooled and removed, and an acid was added to dissolve the suspending agents.

The average gel content for two samples of the resin particles was 0.47% by weight based on the weight of the formed interpolymer resin particles. The melt index was 32.61 g/10 minutes (230° C./5.0 kg).

Example 8

This Example 8 relates to interpolymer resin particles comprising 70% by weight polystyrene based on the weight of the interpolymer resin particles, and 30% by weight of polypropylene. Dicumyl peroxide was added to the formulation to viscbreak the polypropylene. The process for producing the interpolymer resins is similar to Example 7.

A mixture of 520 pounds of de-ionized water, 9.6 pounds of tri-calcium phosphate as a suspending agent, and 27 grams of an anionic surfactant (Nacconol 90) were charged to a polymerization reactor with the agitator running at about 88 rpm to prepare an aqueous medium. The aqueous medium was heated to about 91° C. and held for about 10 minutes. Then 112 pounds of polypropylene pellets (Huntsman P5M4K-046) each weighing about 20 milligrams and having a MI of 25.5 g/10 minutes (230° C./5.0 kg) were suspended in the aqueous medium. The suspension continued to be stirred at 88 rpm. The low temperature polystyrene initiators, i.e., 475 grams of benzoyl peroxide (BPO) (for improved grafting) and 145 grams of tertiary butyl perbenzoate (TBP) (for reducing the styrene residuals), and 173 grams of dicumyl peroxide for viscbreaking the polypropylene were dissolved in 98 pounds of styrene monomer to prepare a monomer solution, and this mixture was pumped into the reactor over 200 minutes. A second batch of 98 pounds of pure styrene was then added to the reactor over 100 minutes at a temperature of 91° C. The reactor contents were held at 91° C. for an additional 90 minutes to allow the styrene to soak into and react within the polypropylene. Then the reactor contents were heated to 140° C. for over 2 hours and held for an additional 4 hours to polymerize the styrene into polystyrene within the matrix of the polypropylene.

After polymerization was completed, the reactive mixture was cooled and removed, and an acid was added to dissolve the suspending agents.

The average gel content for two samples was 0.41% by weight based on the weight of the formed interpolymer resin particles. The melt index was 21.92 g/10 minutes (230° C./5.0 kg).

The particles produced in Examples 1-8 were oven dried at 49° C. and then molded into plaques using an Engel Model 80 injection-molding machine. The mechanical and physical properties were measured and tested according to the standards set up by ASTM. These properties appear in Table 1 below.

As stated herein above, the flexural and tensile properties of the articles formed from the interpolymer resin particles of the invention have values that range between those values for articles made solely from polystyrene and those values for articles made solely from low-density polyethylene, while the thermal and impact properties of the articles made from the interpolymer resin particles approach that of pure polystyrene.

TABLE 2

| Extruder | Layer Structure | Thickness | Adhesion |
|---|---|---|---|
| Berlyn | SCLAIR 31E | 2 mil | Poor |
| Mark II | 50% SCLAIR 31E/50% HIPS5410 | 2 mil | |
| Mark I | HIPS 5410 | 20 mil | |
| Berlyn | SCLAIR 31E | 2 mil | Good |
| Mark II | Example 4(40% PE/60% PS) | 2 mil | |
| Mark I | HIPS 5410 | 20 mil | |
| Berlyn | SCLAIR 31E | 2 mil | Good |
| Mark II | Example 6 (70% PS/30% EVA) | 2 mil | |
| Mark I | HIPS 5410 | 20 mil | |
| Berlyn | SCLAIR 61C | 2 mil | Poor |
| Mark II | 50% SCLAIR 61C/50% HIPS5410 | 2 mil | |
| Mark I | HIPS 5410 | 20 mil | |
| Berlyn | SCLAIR 31E | 2 mil | Poor |
| Mark II | 40% SCLAIR31E/HIPS5410/20% Example 6 (70% PS/30% EVA) | 2 mil | |
| Mark I | HIPS 5410 | 20 mil | |
| Berlyn | Example 5 (60% PS/40% EVA) | 2 mil | Good |
| Mark I | HIPS 5410 | 20 mil | |
| Berlyn | Example 6 | 2 mil | Good |
| Mark I | HIPS 5410 | 20 mil | |
| Berlyn | SCLAIR 31E | 2 mil | Poor |
| Mark I | HIPS 5410 | 20 mil | |
| Berlyn | SCLAIR 61C | 2 mil | Poor |
| Mark I | HIPS 5410 | 20 mil | |

HIPS 5410 (Product of NOVA Chemicals Inc.- high impact polystyrene comprised of styrene and polybutadiene.
SCLAIR 31E (Polyethylene-Melt Index 11.5)
SCLAIR 61C (Polyethylene-Melt Index 5.3)

This Example 9 shows that "good" adhesion occurred when one of the layers of the multi-layer sheet structures consisted of 100% of the interpolymer resin particles of the invention, i.e., Examples 4, 5, and 6.

TABLE 1

| Property | Example 1 | Example 2 | Example 3 | Example 4 | Example 5 | Example 6 | Comp. Example 7 | Comp. Example 8 |
|---|---|---|---|---|---|---|---|---|
| Flex Modulus (KSI) | 200.52 | 256.47 | 170.46 | 222.63 | 211.19 | 269.25 | 303.89 | 348.76 |
| Flex Stress@ <5% (KSI) | 6.67 | 8.34 | 5.63 | 7.55 | 6.78 | NA | 9.14 | 9.08 |
| Strain at Break(Auto) % | 2.14 | 4.43 | 3.00 | 5.48 | 3.17 | 3.30 | 2.51 | 2.07 |
| Stress at Break(Auto)(KSI) | 3.69 | 5.09 | 3.32 | 4.54 | 4.97 | 4.91 | 4.88 | 5.43 |
| YOUNGS Modulus (Auto)(KSI) | NA | 281.92 | NA | 242.02 | 279.95 | 281.52 | 325.65 | 366.07 |
| IZOD Impact Mean | 0.404 | 0.233 | 0.490 | 0.446 | 0.430 | 0.338 | 0.174 | 0.150 |
| DYNATUP-Total Energy (ft-lbs) | 0.43 | 0.47 | 0.55 | 0.50 | NA | NA | 0.53 | 0.42 |
| MI(230° C./5.0 kg) | 1.046 | 0.501 | 1.022 | 2.688 | 0.21 | 0.25 | 32.61 | 21.92 |
| VICAT-Mean (° C.) | 101.00 | 104.8 | 9.00 | 101.6 | NA | NA | 110.2 | 108.7 |
| Gel wt % (Average) | 0.65 | 0.45 | 0.69 | 1.01 | 0.46 | 0.32 | 0.47 | 0.41 |

Example 9

Two and three layer sheet structures using the compositions and type of extruders shown in Table 2 were formed in a WELEX® sheet co-extrusion line. Each stream at temperatures between 221° C. and 232° C. was passed into an extrusion die head (WELEX standard 54" flip lip) to form a continuous multi-layer sheet structure, which in turn, was passed through a roll stack at roll pressures of about 70 psig and roll temperatures ranging between 82° to 88° C. for a curing process. The multi-layer sheet structures were then visually inspected and qualitatively evaluated for adhesion, the results of which appear in Table 2. "Good" indicates no peeling of the layers. "Poor" indicates peeling of the layers.

Example 10

This Example 10 relates to the single FIGURE that illustrates instrumented impact testing values (DYNATUP-Total Energy in ft. lbs.) for Composition A and Composition B. Composition A is the composition of the invention comprising the interpolymer particles of Example 1(60% PS/40% PE) containing polystyrene (NOVA 1210-crystal) in the weight percentages shown in the single FIGURE.

Composition B is a mixture of low-density polyethylene (NOVA-LA-0218-AF pellets) and polystyrene in the weight percentages shown in the FIGURE. Composition A and Composition B were produced by dry blending, compounding in a single-screw extruder, and the cut pellets were injection molded into 3 inch diameter circular plaques for impact testing. The DYNATUP values for Composition A of the invention remained relatively constant as the weight percentage of polystyrene increased, while those for Composition B dropped as the weight percentage of polystyrene increased. This indicates improved compatibility between polyethylene and polystyrene for the interpolymer particles of the invention compared to pure physical blends of polyethylene and polystyrene.

Example 11

This Example 11 illustrates the environmental stress crack resistance properties (ESCR) of the 70% PS/30% EVA (Example 6) resin vs. 100% Polystyrene (PS) crystal (NOVA 1510 grade). Ten specimens were used as control samples. The chemical resistance test results for molded samples are shown in Table 3.

TABLE 3

|  | 0.5% Strain No oil exposure | 0.5% Strain With oil exposure |
|---|---|---|
| 70% PS/30% EVA | | |
| Specimen Thickness | 0.12 inches | 0.12 inches |
| Specimen Width | 0.51 inches | 0.51 inches |
| Tensile Stress @ Break | 5.1 kpsi | 5.07 kpsi |
| Standard Deviation | 0.1 | 0.1 |
| Tensile Strain @ Break | 2.6% | 2.6% |
| Standard Deviation | 0.2 | 0.2 |
| Young's Modulus | 268 kpsi | 271 kpsi |
| Standard Deviation | 10.4 | 8.6 |
| Percentage Decrease in Mechanical Properties | | |
| Tensile Stress @ Break | — | 0 |
| Tensile Strain @ Break | — | 0 |
| Young's Modulus | — | 0 |
| 100% PS CRYSTAL (1510 NOVA grade) | | |
| Specimen Thickness | 0.125 inches | 0.125 inches |
| Specimen Width | 0.51 inches | 0.51 inches |
| Tensile Stress @ Break | 6.25 kpsi | 1.34 kpsi |
| Standard Deviation | +/−0.3 | +/−0.4 |
| Tensile Strain @ Break | 1.5% | 0.4% |
| Standard Deviation | 0.1 | 0.1 |
| Young's Modulus | 507.3 ksi | 558.5 ksi |
| Standard Deviation | 10.2 | 93.9 |
| Percentage Decrease in Mechanical Properties | | |
| Tensile Stress @ Break | — | 80 |
| Tensile Strain @ Break | — | 74 |
| Young's Modulus | — | −10.1 |

Notes:
All specimens were conditioned at 23° C. and 50% relative humidity before chemical resistance exposure or testing. The food substance used was a solution of 50% cottonseed oil and 50% oleic acid (by weight). All tensile testing was performed using a 0.2 inch/minute crosshead speed using a 2" extensiometer.

For a 7-day period, the "Tensile Stress @ Break" fell off by 80% for PS Crystal specimens exposed to 0.5% strain and a mixture of oils, i.e., 6.25 kpsi was reduced to 1.34 kpsi, while the "Tensile Stress @ Break" for the interpolymer of Example 6 remained relatively the same, i.e., 5.07 kpsi vs. 5.10 kpsi.

Example 12

A blend containing 98 wt. % FPs 117C (linear low density polyethylene available from NOVA Chemicals) and 2 wt. % of an interpolymer of 70 wt. % ethylene-vinyl acetate copolymer (EVA)/30 wt. % polystyrene (prepared as described in Example 1) was prepared by compounding on a Leistritz twin screw extruder (co-rotating, inter-meshing, 35/1-L/D). The blend was processed at temperatures between 190 and 230° C. Vacuum was pulled from one or more of the ports to extract unnecessary volatiles or by-products from the mixtures. The blend was strand cut/pelletized after being cooled with flowing tap water.

The films of the polyethylene alone (PE) and blend (Blend) were produced using a Macro Engineering and Technology blown film line under the following conditions:
  Blow Up Ratio (BUR)=2.5:1
  Die Gap: 50 mil
  Dual lip air ring
  Film Gauge=1 mil
  Melt Temperature=211° C.
  Line Speed=71.8 ft/min.

TABLE 4

| Resin | Max Output (lb/hr) | Melt Temp (° C.) | Current (amps) | Screw Speed (rpm) | Air Ring Pressure (inches of water) |
|---|---|---|---|---|---|
| PE | 398 | 234 | 16.3 | 58 | 12.5 |
| Blend | 439 | 233 | 16.2 | 64 | 16 |

The processing improvement using the blend according to the invention provided a nine percent improved output compared with the polyethylene alone. Qualitative antiblock properties were also observed for the blend.

Example 13

A blend of 90 wt % FP 120C (linear low density polyethylene available from NOVA Chemicals) and 10 wt. % of the interpolymer used in Example 12 was prepared as described in Example 12 (90/10 blend). Film samples of the polyethylene (PE) alone and the blend were prepared as described in Example 12. Comparative physical properties of the sheets are shown in Table 5.

TABLE 5

|  | PE | 90/10 Blend | Improvement (%) |
|---|---|---|---|
| Dart Impact (g/ml) | 282 | 421 | 49 |
| 1% Sec Modulus—MD (MPa) | 176 | 278 | 58 |
| 1% Sec Modulus—TD (MPa) | 209 | 306 | 46 |
| Tensile Break Str—MD (MPa) | 34.4 | 45.6 | 33 |
| Tensile Break Str—TD (MPa) | 33.0 | 40.2 | 22 |
| Elongation at Break—MD (%) | 445 | 588 | 32 |
| Elongation at Break—TD (%) | 693 | 774 | 12 |
| Tensile Yield Str—MD (MPa) | 10.7 | 12.8 | 20 |
| Tensile Yield Str—TD (MPa) | 9.9 | 11.4 | 15 |
| Tensile Elongation at Yield—MD (%) | 16 | 16 | 0 |
| Tensile Elongation at Yield—TD (%) | 20 | 15 | −25 |

The blend film demonstrated a 50% modulus increase in both the machine and transverse directions, almost 50% increase in Dart impact, and 30% improvement in tensile and elongation properties over the film that was 100% polyethylene.

Example 14

A/B/A film structures were produced as described in Example 12 using the indicated Blow-up Ratio and film thickness. The core layer (B) made up 60 wt. % of the overall film composition, and the (A) layers were 20 wt. % each. They (A) layers were NOVAPOL® TD-9022-C (9022) polyethylene resin (ethylene-hexane copolymer), which had a Melt Index of 0.8 g/10 min. (ASTM D1238, 190° C./2.16 Kg) and density of 0.916 g/cm³ (ASTM D792).

The core layer (B) was as described in the table below using the interpolymer described in Example 12 (interpolymer). All percentages at expressed in wt. %.

|  | Core Layer (B) | | |
| --- | --- | --- | --- |
|  | 100% 9022 | 98% 9022 2% interpolymer | 98% 9022 2% interpolymer |
| Blow-up Ratio | 3:1 | 3:1 | 1.7:1 |
| Film thickness | 3 mil | 3 mil | 3 mil |
| Film density | 0.9180 g/cm³ | 0.9178 g/cm³ | 0.9184 g/cm³ |
| Dart Impact (g) | 1240 | 1258 | 922 |
| 1% Sec Modulus - MD (MPa) | 156 | 167 | 171 |
| 1% Sec Modulus - TD (MPa) | 167 | 173 | 182 |

A slight increase in modulus of the blown film having a core layer (B) containing the present interpolymer compared to the pure polyethylene film. This observation indicates that low loadings of interpolymer can increase the physical properties without harming other physical properties.

In addition, these results exhibit the importance of the blown film processing conditions, as the interpolymer containing blown film processed at a 3.0:1 blow up ratio showed improved physical properties compared to the same polystyrene/polyethylene interpolymer containing blown film processed at a 1.7:1 blow up ratio.

The following table indicates that even low loadings of the present interpolymer in core layer (B) of a three-layer film can significantly increase certain physical characteristics of blown films. In this particular case, creep was measured on the 3.0:1 blow up ratio films composed of pure polyethylene and the sample using core layer (B) containing the present interpolymer. The data shows loadings as low as 2% in a core layer of an A/B/A blown film structure (20/60/20) can provide increased creep resistance, or lower elongation under constant load.

|  | 100% 9022 | | 98% 9022/2% interpolymer | |
| --- | --- | --- | --- | --- |
| Time (Hours) | MD (%) | TD (%) | MD (%) | TD (%) |
| 0 | 0 | 0 | 0 | 0 |
| 0.001 | 5 | 5 | 3 | 3 |
| 0.08 | 6 | 6 | 3 | 3 |
| 0.5 | 8 | 10 | 5 | 6 |
| 1 | 10 | 10 | 5 | 6 |
| 2 | 10 | 10 | 5 | 6 |
| 4 | 10 | 11 | 5 | 8 |
| 6 | 13 | 13 | 6 | 10 |
| 24 | 13 | 13 | 6 | 10 |
| 48 | 13 | 14 | 6 | 11 |

Example 15

A/B/A film structures were produced on a Gloucester cast film line equipped with 2.5" extruders. The core layer (B) comprised of 80% of the overall film composition, while film thickness was 0.8 mil. Die lips gap and line speed were set at 20 mils and 800 feet per minute, respectively. The (A) layers was SCLAIR® FG220-A (220) polyethylene resin (ethylene-octene copolymer), which had a Melt Index of 2.3 g/10 min. (ASTM D1238, 190° C./2.16 Kg) and density of 0.920 g/cm³ (ASTM D 792). The core layer (B) was as described in the table below using the interpolymer described in Example 6 (ex-int). All percentages are expressed in wt. %.

|  | Core Layer (B) | | | |
| --- | --- | --- | --- | --- |
|  | 100% 220 | 90% 220 10% ex-int | 80% 220 20% ex-int | 60% 220 40% ex-int |
| Density Column (g/cm³) | 0.9151 | 0.9201 | 0.9230 | 0.9337 |
| Dart Impact (g/mil) | 129 | 183 | 186 | 125 |
| 1% Secant Modulus MD (MPa) | 131 | 280 | 380 | 672 |
| 2% Secant Modulus MD (MPa) | 122 | 257 | 359 | 626 |
| 1% Secant Modulus TD (MPa) | 158 | 185 | 217 | 279 |
| 2% Secant Modulus TD (MPa) | 135 | 171 | 194 | 253 |
| Tensile Elongation MD (%) | 396 | 506 | 250 | 108 |
| Tensile Elongation TD (%) | 687 | 647 | 578 | 461 |
| Tensile Yield Strength MD (MPa) | 10 | 12 | 16 | 20 |
| Tensile Yield Strength TD (MPa) | 9 | 11 | 11 | 13 |
| Elmendorf Tear MD (G) | 247 | 91 | 54 | 14 |
| Elmendorf Tear TD (G) | 484 | 356 | 271 | 23 |
| Highlight Ultimate Strength Test (%) | 360 | 538 | 126 | 55 |

As indicated in the table, the density of the interpolymer containing films increased with increased interpolymer loadings. Increases in modulus are also observed with increased interpolymer loadings. Films with greater moduli offer the advantage of increased stiffness.

Dart impact properties increased up to 20% interpolymer loading and were lower at 40% interpolymer loading. Film stiffness doubled with 10% interpolymer loading. Films with greater impact properties offer the advantage of increased toughness.

The interpolymer containing films showed lower tear properties. This indicates that films containing the interpolymers may have increased peelability properties.

In general, the results indicate that a converter would be able to tailor the stiffness and toughness properties of polyethylene-based cast films by incorporating specific amounts of the present interpolymer.

Compared to the pure polyethylene film control, the interpolymer containing films demonstrated a property known in the art as "good lock up" (maintains shape after stretching) and did not demonstrate ultimate failure, which represents a safety factor for both machine and hand wrap. This property was simulated on a Highlight stretch apparatus. The pure polyethylene control displayed an ultimate break of 330 to 380%. When the in the sample containing 10% interpolymer core layer (B) was pulled on the Highlight apparatus, the film showed an ultimate break of 510 to 550%.

Example 16

A/B/A film structures were produced on a Gloucester cast film line equipped with 2.5" extruders. The core layer (B) comprised of 80% of the overall film composition, while film thickness was 0.8 mil. Die lips gap and line speed were set at 20 mils and 800 feet per minute, respectively. The (A) layers was SCLAIR® FG120-A (120) polyethylene resin (ethylene-octene copolymer), which had a Melt Index of 1.0 g/10 min. (ASTM D1238, 190° C./2.16 Kg) and density of 0.920 g/cm³ (ASTM D 792). The core layer (B) was as described in the table below using the interpolymer described in Example 6 (ex-int). All percentages are expressed in wt. %.

|  | Core Layer (B) | | |
| --- | --- | --- | --- |
|  | 100% 120 | 90% 120 10% ex-int | 80% 120 20% ex-int |
| Density Column (g/cm³) | 0.9147 | 0.9210 | 0.9225 |
| Dart Impact (g/mil) | 246 | 328 | 221 |
| 1% Secant Modulus MD (MPa) | 117 | 260 | 399 |
| 2% Secant Modulus MD (MPa) | 110 | 248 | 376 |
| 1% Secant Modulus TD (MPa) | 148 | 185 | 226 |
| 2% Secant Modulus TD (MPa) | 131 | 167 | 201 |
| Tensile Elongation MD (%) | 340 | 353 | 239 |
| Tensile Elongation TD (%) | 669 | 626 | 606 |
| Tensile Yield Strength MD (MPa) | 8 | 12 | 15 |
| Tensile Yield Strength TD (MPa) | 8 | 10 | 11 |
| Elmendorf Tear MD (G) | 349 | 64 | 38 |
| Elmendorf Tear TD (G) | 589 | 463 | 435 |
| Highlight Ultimate Strength Test (%) | 249 | 366 | — |

As indicated in the table, the density of the interpolymer containing films increased with increased interpolymer loadings. Increases in modulus are also observed with increased interpolymer loadings. Films with greater moduli offer the advantage of increased stiffness.

Dart impact properties increased up to 10% interpolymer loading. Film stiffness doubled with 10% interpolymer loading. Films with greater impact properties offer the advantage of increased toughness.

The interpolymer containing films showed lower tear properties. This indicates that films containing the interpolymers may have increased peelability properties.

In general, the results indicate that a converter would be able to tailor the stiffness and toughness properties of poly-ethylene-based cast films by incorporating specific amounts of the present interpolymer.

Compared to the pure polyethylene film control, the interpolymer containing films demonstrated a property known in the art as "good lock up" (maintains shape after stretching) and did not demonstrate ultimate failure, which represents a safety factor for both machine and hand wrap. This property was simulated on a Highlight stretch apparatus. The pure polyethylene control displayed an ultimate break of 249%. When the sample containing 10% interpolymer core layer (B) was pulled on the Highlight apparatus, the film showed an ultimate break of 366%.

While the present invention has been particularly set forth in terms of specific embodiments thereof, it will be understood in view of the instant disclosure that numerous variations upon the invention are now enabled yet reside within the scope of the invention. Accordingly, the invention is to be broadly construed and limited only by the scope and spirit of the claims now appended hereto.

What is claimed is:

1. A polymer composition comprising
from about 0.1 to about 60 percent by weight of interpolymer resin particles comprising a styrenic polymer intercalated within a polyolefin,
wherein the polyolefin is present at from about 20% to about 80% by weight based on the weight of the particles, has a VICAT softening temperature greater than 60° C. and a melt index of from about 0.3 to about 15 g/10 minutes (190° C./2.16 kg), and
the styrenic polymer is present at from about 20% to about 80% by weight based on the weight of the particles, and
wherein the interpolymer resin particles have a gel content ranging from about 0 to about 5% by weight based on the weight of said interpolymer resin particles, a VICAT softening temperature ranging from about 85° C. to about 115° C., and a melt index value ranging from about 0.1 to about 6.0 (230° C./5.0 kg); and
from about 40 to about 99.9 percent by weight of at least one second polymer.

2. The polymer composition according to claim 1, wherein the interpolymer resin particles are formed by polymerizing styrene in the polyolefin resin particles to form an interpenetrating network of polyolefin resin particles and polystyrene particles.

3. The polymer composition according to claim 1, wherein the polyolefin in the interpolymer resin particles is not cross-linked.

4. The polymer composition according to claim 1, wherein the polyolefin in the interpolymer resin particles is selected from the group consisting of polyethylene, polypropylene, thermoplastic olefins, plastomers and thermoplastic elastomers resins.

5. The polymer composition according to claim 1, wherein the polyolefin in the interpolymer resin particles is selected from the group consisting of low-density polyethylene, medium-density polyethylene, high-density polyethylene, copolymers of ethylene and vinyl acetate, copolymers of ethylene and propylene, copolymers of propylene and vinyl acetate, homopolymers of propylene, ethylene/vinyl chloride copolymers, polyisobutylene, butyl rubber, styrene/butadiene rubber, polybutene, polybutadiene and blends thereof.

6. The polymer composition according to claim 1, wherein the styrenic polymer is a polymer formed by polymerizing one or more styrenic monomers selected from the group consisting of styrene, α-methyl-styrene, ethylstyrene, chlorostyrene, bromostyrene, vinyltoluene, vinylbenzene, and isopropylxylene.

7. The polymer composition according to claim 1, wherein the styrenic polymer is a polymer formed by polymerizing one or more styrenic monomers with one or more monomers selected from the group consisting of acrylonitrile, methyl methacrylate, butyl acrylate, and methyl acrylate.

8. The polymer composition according to claim 1, wherein the polyolefin is polyethylene and the styrenic polymer is polystyrene.

9. The polymer composition according to claim 1, wherein the second polymer is selected from polyolefins and styrenic polymers.

10. The polymer composition according to claim 1, wherein the second polymer is a polyolefin selected from the group consisting of polyethylene; polypropylene; copolymers ethylene and an olefinic monomer; copolymers of one or more olefinic monomers and one or more $C_1$-$C_4$ alkyl (meth) acrylates; copolymers of one or more olefinic monomers and acrylonitrile; copolymers of one or more olefinic monomers and vinyl acetate; copolymers of one or more olefinic monomers and butadiene; copolymers of one or more olefinic monomers and isoprene; copolymers of one or more olefinic monomers and styrene, and combinations thereof.

11. The polymer composition according to claim 1, wherein the second polymer is a polyolefin selected from the group consisting of ethylene-vinyl acetate copolymers, HDPE, LDPE, LLDPE, VLDPE, polypropylene, and combinations thereof.

12. The polymer composition according to claim 1 comprising one or more additives and adjuvants selected from the group consisting of anti-blocking agents, antioxidants, antistatic additives, activators, biodegradation enhancers, zinc oxide, chemical foaming agents, colorants, dyes, filler materials, flame retardants, heat stabilizers, impact modifiers, light stabilizers, light absorbers, lubricants, nucleating agents, pigments, plasticizers, processing aids, slip agents, softening agents, and combinations thereof.

13. The polymer composition according to claim 1, wherein the polymer composition has Dart impact properties greater than the corresponding second polymer alone.

14. A film comprising a polymer composition that includes from about 0.1 to about 60 percent by weight of interpolymer resin particles comprising a styrenic polymer intercalated within a polyolefin,
wherein the polyolefin is present at from about 20% to about 80% by weight based on the weight of the particles, and
the styrenic polymer is present at from about 20% to about 80% by weight based on the weight of the particles, and
from about 40 to about 99.9 percent by weight of at least one second polymer.

15. The film according to claim 14, wherein the polyolefin in the interpolymer resin particles is selected from the group consisting of polyethylene, polypropylene, thermoplastic olefins, plastomers and thermoplastic elastomers resins.

16. The film according to claim 14, wherein the styrenic polymer is a polymer formed by polymerizing one or more styrenic monomers selected from the group consisting of styrene, $\alpha$-methylstyrene, ethylstyrene, chlorostyrene, bromostyrene, vinyltoluene, vinylbenzene, and isopropylxylene.

17. The film according to claim 14, wherein the second polymer is a polyolefin selected from the group consisting of ethylene-vinyl acetate copolymers, HDPE, LDPE, LLDPE, VLDPE, polypropylene, and combinations thereof.

18. A multilayer film structure comprising one or more film layers comprising the film according to claim 14.

19. A method of improving the Dart impact properties of a polyolefin film comprising:
blending from about 0.1 to about 10 percent by weight based on the weight of the film of interpolymer resin particles into the polyethylene prior to forming the film;
wherein the interpolymer resin particles comprise a styrenic polymer intercalated within a polyolefin,
wherein the polyolefin is present at from about 20% to about 80% by weight based on the weight of the particles, and
the styrenic polymer is present at from about 20% to about 80% by weight based on the weight of the particles.

* * * * *

UNITED STATES PATENT AND TRADEMARK OFFICE
CERTIFICATE OF CORRECTION

| | | |
|---|---|---|
| PATENT NO. | : 8,168,722 B2 | Page 1 of 1 |
| APPLICATION NO. | : 13/033870 | |
| DATED | : May 1, 2012 | |
| INVENTOR(S) | : Steven M. Krupinski and Eric Vignola | |

It is certified that error appears in the above-identified patent and that said Letters Patent is hereby corrected as shown below:

Title Page, Item (57) ABSTRACT, last sentence, after "ranging from 0.1 to 6.0" insert --g/10 minutes--.

In column 1, line 39, after "value of 0.3 to 10", insert --g/10 minutes--.

In column 3, line 31, after "from about 9.0 to about 6.0", insert --g/10 minutes--.

In column 3, line 57, replace "(ft. lbs.)" with "(ft-lbs)".

In column 5, line 61, replace "plastic elastomers" with "plastic elastomer".

In column 7, line 64, replace "by the inventor" with "by the inventors".

In column 9, line 5, replace "stearyl" with "stearoyl".

In column 12, at the end of line 30, replace "polyox-" with "polyoxy-".

Signed and Sealed this
Twenty-fourth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,168,722 B2
APPLICATION NO. : 13/033870
DATED : May 1, 2012
INVENTOR(S) : Steven M. Krupinski and Eric Vignola It is certified that error appears in the above-identified patent and that said Letters Patent is hereby corrected as shown below:

Title Page, Item (57) ABSTRACT, last sentence, after "ranging from 0.1 to 6.0", insert --g/10 minutes--.

In column 1, line 39, after "value of 0.3 to 10", insert --g/10 minutes--.

In column 3, line 31, after "from about 9.0 to about 6.0", insert --g/10 minutes--.

In column 3, line 57, replace "(ft. lbs.)" with "(ft-lbs)".

In column 5, line 61, replace "plastic elastomers" with "plastic elastomer".

In column 7, line 64, replace "by the inventor" with "by the inventors".

In column 9, line 5, replace "stearyl" with "stearoyl".

In column 12, at the end of line 30, replace "polyox-" with "polyoxy-".

In column 12, line 63, replace "montmorolites" with "montmorillonites".

In column 13, at the end of line 31, replace "trade" with "tradename".

In column 13, line 44, replace "of0.1" with "of 0.1".

In column 13, at the end of line 51, replace "homogenous" with "homogeneous".

In column 13, line 67, replace "homogenous" with "homogeneous".

In column 19, in TABLE 1, in the column under "Property", first line, replace "(KSI)", with "(kpsi)".

In column 19, in TABLE 1, in the column under "Property", third line, replace "(KSI)", with "(kpsi)".

In column 19, in TABLE 1, in the column under "Property", seventh line, replace "(KSI)", with "(kpsi)".

In column 19, in TABLE 1, in the column under "Property", ninth line, replace "(KSI)", with "(kpsi)".

This certificate supersedes the Certificate of Correction issued July 24, 2012.

Signed and Sealed this
Eighteenth Day of September, 2012

David J. Kappos
*Director of the United States Patent and Trademark Office*

In column 19, in TABLE 1, in the column under "Property", thirteenth line, after "MI" insert --g/10 min--.

In column 20, line 56, replace "ft. lbs." with "ft-lbs".

In column 22, line 65, replace "They (A)" with "The (A)".

In column 22, line 66, replace "layers were" with "layer was".

In column 22, line 67, replace "ethylene-hexane" with "ethylene-hexene".

In column 23, at the end of line 66, replace "The (A) layers" with "The (A) layer".

In column 24, line 57, after "When the", delete "in the".

In column 24, at the end of line 67, replace "The (A) layers" with "The (A) layer".

In column 26, line 11, after "about 0.1 to about 6.0", insert --g/10 mins--.

In column 26, line 27, replace "tomers resins" with "tomer resins".